US011479285B2

(12) United States Patent
Guo et al.

(10) Patent No.: US 11,479,285 B2
(45) Date of Patent: Oct. 25, 2022

(54) WHEELED CARRYING APPARATUS

(71) Applicant: Wonderland Switzerland AG, Steinhausen (CH)

(72) Inventors: Zheng-Wen Guo, Guangdong (CN); Er Xue Wang, Guangdong (CN); Shoufeng Hu, Guangdong (CN); Mingxing Sun, Guangdong (CN); Hongtao Yin, Guangdong (CN)

(73) Assignee: Wonderland Switzerland AG, Steinhausen (CH)

( * ) Notice: Subject to any disclaimer, the term of this patent is extended or adjusted under 35 U.S.C. 154(b) by 0 days.

(21) Appl. No.: 17/017,401

(22) Filed: Sep. 10, 2020

(65) Prior Publication Data

US 2021/0070344 A1 Mar. 11, 2021

(30) Foreign Application Priority Data

Sep. 11, 2019 (CN) .......................... 201910858955.3
Apr. 30, 2020 (CN) .......................... 202010370191.6

(51) Int. Cl.
*B62B 9/08* (2006.01)
*B62B 9/12* (2006.01)

(52) U.S. Cl.
CPC .................. *B62B 9/08* (2013.01); *B62B 9/12* (2013.01)

(58) Field of Classification Search
CPC ........... B62B 7/042; B62B 9/08; B62B 9/085; B62B 9/087; B62B 5/0438; B62B 9/12; B60B 33/026
See application file for complete search history.

(56) References Cited

U.S. PATENT DOCUMENTS 4,349,938 A * 9/1982 Fontana ................ B60B 33/021
16/35 R
4,997,066 A * 3/1991 Bigo ....................... B62B 9/082
188/69
(Continued)

FOREIGN PATENT DOCUMENTS

CA 2820031 A1 12/2013
CN 1031204 A 2/1989
(Continued)

OTHER PUBLICATIONS

International Search Report of the corresponding PCT Application No. PCT/EP2020/075385 dated Mar. 12, 2021.
(Continued)

*Primary Examiner* — Jeffrey J Restifo
(74) *Attorney, Agent, or Firm* — NZ Carr Law Office PLLC

(57) ABSTRACT

A wheeled carrying apparatus includes a standing frame, a handle frame, a wheel mount, a locking assembly and a release mechanism. The handle frame is rotatable between a first and a second position of different inclinations. The wheel mount carries a wheel and is rotatable relative to the standing frame for changing an orientation of the wheel axis. The locking assembly includes a wheel mount latch adapted to engage and rotationally lock the wheel mount relative to the standing frame, and to disengage and unlock the wheel mount. The release mechanism includes an operating part carried with the handle frame and is configured so that the operating part is operable to cause the wheel mount latch to disengage the wheel mount when the handle frame is in the first position, the operating part being operatively decoupled from the wheel mount latch when the handle frame is in the second position.

23 Claims, 12 Drawing Sheets

(56) References Cited

U.S. PATENT DOCUMENTS

| | | | | |
|---|---|---|---|---|
| 5,125,676 | A * | 6/1992 | Teng | B60B 33/0015 280/47.38 |
| 5,351,364 | A * | 10/1994 | Zun | B60B 33/025 16/35 R |
| 6,212,733 | B1 * | 4/2001 | Yeh | B60B 33/0068 16/35 R |
| 6,315,309 | B1 * | 11/2001 | Li | B62B 7/08 280/47.38 |
| 7,083,175 | B1 * | 8/2006 | Liu | B60B 33/0073 280/47.38 |
| 7,210,690 | B2 * | 5/2007 | Tan | B62B 7/04 280/47.38 |
| 7,490,848 | B2 * | 2/2009 | Wu | B62B 7/04 280/47.38 |
| 7,922,182 | B2 * | 4/2011 | Van der Vegt | B62B 9/20 280/47.39 |
| 8,328,226 | B2 * | 12/2012 | Xu-Hui | B62B 7/042 280/658 |
| 9,044,656 | B2 * | 6/2015 | Zhang | B62B 3/12 |
| 9,592,846 | B1 * | 3/2017 | Hanson | B62B 7/068 |
| 2003/0204933 | A1 * | 11/2003 | Yeh | B60B 33/026 16/35 R |
| 2004/0226134 | A1 * | 11/2004 | Chen | B60B 1/006 16/35 R |
| 2005/0194755 | A1 * | 9/2005 | Lan | B62B 7/042 280/47.38 |
| 2010/0259022 | A1 * | 10/2010 | Zhong | B60B 33/0042 280/47.34 |
| 2011/0285110 | A1 * | 11/2011 | Xu-Hui | B62B 9/203 280/650 |
| 2012/0043730 | A1 * | 2/2012 | Walther | B62K 5/08 280/62 |
| 2013/0069329 | A1 * | 3/2013 | Chaudeurge | B62B 9/08 280/86 |
| 2017/0057284 | A1 * | 3/2017 | Wang | B62B 3/001 |
| 2017/0066465 | A1 * | 3/2017 | Hanson | B62B 7/06 |
| 2018/0065655 | A1 * | 3/2018 | Leys | B62B 7/064 |
| 2020/0391783 | A1 * | 12/2020 | Zheng | B62B 7/044 |
| 2021/0046968 | A1 * | 2/2021 | Zheng | B62B 9/087 |
| 2021/0070344 | A1 * | 3/2021 | Guo | B62B 7/08 |
| 2022/0009538 | A1 * | 1/2022 | Guo | B62B 9/082 |

FOREIGN PATENT DOCUMENTS

| | | |
|---|---|---|
| CN | 104176105 A | 12/2014 |
| CN | 110 834 664 A | 2/2020 |
| CN | 110 901 746 A | 3/2020 |
| EP | 2 946 985 A1 | 11/2015 |
| EP | 2946985 | 11/2015 |
| EP | 2946985 A1 | 11/2015 |
| JP | 2002-284015 | 10/2002 |
| JP | 2019-131025 | 8/2019 |
| TW | 201043510 A | 12/2010 |

OTHER PUBLICATIONS

Search Report of the corresponding EP Patent Application No. 20195526.7 dated Jan. 27, 2021.

Office Action and the search report in Taiwanese counterpad 109131084 (with English translation) dated Oct. 1, 2021.

Office Action of the corresponding JP Patent Application No. 2020-151702 (with English translation) dated Jun. 29, 2021.

Office Action with English and Chinese search reports in corresponding Taiwanese patent application No. 111116957 dated Jul. 5, 2022.

* cited by examiner

WHEELED CARRYING APPARATUS

CROSS-REFERENCE TO RELATED APPLICATION(S)

This application respectively claims priority to China patent application no. 201910858955.3 filed on Sep. 11, 2019, and to China patent application no. 202010370191.6 filed on Apr. 30, 2020.

BACKGROUND

1. Field of the Invention

The present invention relates to wheeled carrying apparatuses.

2. Description of the Related Art

Caregivers usually rely on a stroller apparatus to transport babies and children. Most stroller apparatuses typically have front wheels that can freely rotate horizontally relative to the stroller frame for changing the orientation of the wheel axes, and rear wheels that cannot rotate horizontally and have a fixed wheel axis oriented transversally. As a result, it may not be easy for the stroller apparatus to turn around in an environment of limited space.

Therefore, there is a need for an improved design that can offer better maneuverability and address at least the foregoing issues.

SUMMARY

The present application describes a wheeled carrying apparatus having wheel assemblies that can be controllably locked and unlocked in horizontal orientation and can offer better maneuverability.

According to one embodiment, the wheeled carrying apparatus includes a standing frame and a handle frame pivotally coupled to each other, a first wheel mount, a locking assembly and a release mechanism. The handle frame is rotatable relative to the standing frame between a first position and a second position of different inclinations. The first wheel mount carries a first wheel and is pivotally connected with the standing frame, the first wheel being rotatable relative to the first wheel mount about a first wheel axis. The locking assembly includes a first wheel mount latch movably connected with the standing frame, the first wheel mount latch being adapted to engage with the first wheel mount and thereby rotationally lock the first wheel mount with respect to the standing frame, and adapted to disengage from the first wheel mount and thereby unlock the first wheel mount so that the first wheel mount is rotatable relative to the standing frame for changing an orientation of the first wheel axis. The release mechanism includes an operating part carried with the handle frame, the release mechanism being configured so that the operating part is operable to cause the first wheel mount latch to disengage from the first wheel mount when the handle frame is in the first position, and the operating part is operatively decoupled from the first wheel mount latch when the handle frame is in the second position.

According to an embodiment, the release mechanism includes a link actuator movably connected with the standing frame; a first linking part coupling the first wheel mount latch to the link actuator; a driving part movably connected with the handle frame; and a second linking part coupling the driving part to the operating part; wherein the driving part is located adjacent to the link actuator when the handle frame is in the first position and is displaced away from the link actuator when the handle frame is in the second position, the operating part being operable to cause the first wheel mount latch to disengage from the first wheel mount via a contact between the driving part and the link actuator when the handle frame is in the first position.

According to an embodiment, any one of the first linking part and the second linking part includes a cable.

According to an embodiment, the first linking part loops around a pulley.

According to an embodiment, the link actuator is connected with a spring, the spring biasing the link actuator in a direction that urges the link actuator in contact with the driving part.

According to an embodiment, the driving part is slidably connected with the handle frame.

According to an embodiment, the standing frame includes a carrier bar pivotally connected with the handle frame, the link actuator being movably connected and carried with the carrier bar.

According to an embodiment, the wheeled carrying apparatus further includes a second wheel mount carrying a second wheel and pivotally connected with the standing frame, the second wheel being rotatable relative to the second wheel mount about a second wheel axis, the first and second wheel mounts being spaced apart from each other along a lengthwise axis of the wheeled carrying apparatus extending from a rear to a front thereof; and a second locking assembly including a second wheel mount latch movably connected with the standing frame, the second wheel mount latch being adapted to engage with the second wheel mount and thereby rotationally lock the second wheel mount with respect to the standing frame, and adapted to disengage from the second wheel mount and thereby unlock the second wheel mount so that the second wheel mount is rotatable relative to the standing frame for changing an orientation of the second wheel axis; wherein the release mechanism is configured so that the operating part is operable to cause the first wheel mount latch to disengage from the first wheel mount and meanwhile is operatively decoupled from the second wheel mount latch when the handle frame is in the first position, and the operating part is operable to cause the second wheel mount latch to disengage from the second wheel mount and meanwhile is operatively decoupled from the first wheel mount latch when the handle frame is in the second position.

According to an embodiment, the release mechanism includes a first and a second link actuator respectively connected movably with the standing frame, the first link actuator being operable independently of the second link actuator; a driving part carried with the handle frame; a first linking part coupling the first wheel mount latch to the first link actuator; a second linking part coupling the driving part to the operating part; and a third linking part coupling the second wheel mount latch to the second link actuator; wherein the driving part is located adjacent to the first link actuator and displaced away from the second link actuator when the handle frame is in the first position, and is located adjacent to the second link actuator and displaced away from the first link actuator when the handle frame is in the second position, the operating part being operable to cause the first wheel mount latch to disengage from the first wheel mount via a contact between the driving part and the first link actuator when the handle frame is in the first position, and the operating part being operable to cause the second wheel mount latch to disengage from the second wheel mount via a contact between the driving part and the second link actuator when the handle frame is in the second position.

According to an embodiment, any one of the first, second and third linking part includes a cable.

According to an embodiment, the first link actuator is slidably connected with the standing frame.

According to an embodiment, the second link actuator is pivotally or slidably connected with the standing frame.

According to an embodiment, the driving part is slidably connected with the handle frame.

According to an embodiment, the standing frame includes a first leg frame having a first side segment, and a second leg frame having a second side segment, the first linking part extending along a portion of the first side segment, and the third linking part extending along a portion of the second side segment.

According to an embodiment, the second link actuator is movably connected and carried with the second leg frame.

According to an embodiment, the standing frame further includes a carrier bar pivotally connected with the handle frame, the first link actuator being movably connected and carried with the carrier bar.

According to an embodiment, the handle frame is pivotally coupled to the standing frame via a bar linkage, and the standing frame further includes a side linking bar, the bar linkage being respectively connected pivotally with the first side segment of the first leg frame and the handle frame, and the carrier bar being respectively connected pivotally with the side linking bar, the bar linkage and the handle frame.

According to an embodiment, the first linking part further extends along a portion of the side linking bar and a portion of the carrier bar.

According to an embodiment, the first linking part further extends along a portion of the bar linkage and a portion of the carrier bar.

According to an embodiment, the wheeled carrying apparatus further includes an actuating assembly that is respectively coupled to the first wheel mount latch and the second wheel mount latch and is operable independent of the release mechanism, wherein the actuating assembly includes: a third link actuator rotationally coupled to the handle frame; and a fourth linking part that loops around the third link actuator and has a first and a second end respectively anchored to the first wheel mount latch and the second wheel mount latch; wherein the third link actuator is rotatable along with the handle frame in a first direction to pull the second end of the fourth linking part and thereby urge the second wheel mount latch to disengage from the second wheel mount and concurrently relax the first end of the fourth linking part for engagement of the first wheel mount latch with the first wheel mount, and the third link actuator is rotatable along with the handle frame in a second direction opposite to the first direction to pull the first end of the fourth linking part and thereby urge the first wheel mount latch to disengage from the first wheel mount and concurrently relax the second end of the fourth linking part for engagement of the second wheel mount latch with the second wheel mount.

According to an embodiment, the fourth linking part includes a cable.

According to an embodiment, the standing frame further includes a carrier bar pivotally connected with the handle frame about a pivot axis, the handle frame being rotatable about the pivot axis relative to the standing frame between the first position and the second position, the third link actuator being pivotally connected with the standing frame about the same pivot axis, and the fourth linking part extending along the carrier bar.

According to an embodiment, the wheeled carrying apparatus is implemented as a child stroller apparatus.

DETAILED DESCRIPTION OF THE EMBODIMENTS

The present application provides a wheeled carrying apparatus that includes a standing frame, and a plurality of wheel assemblies provided at a bottom of the standing frame. The wheel assemblies can be controllably locked and unlocked in horizontal orientation with respect to a standing frame, wherein an unlocked wheel assembly can rotate relative to the standing frame for changing the horizontal orientation of a wheel axis. According to the needs, some of the wheel assemblies are locked while others are unlocked, or all of the wheel assemblies can be unlocked at the same time as desired.

Accordingly, the wheeled carrying apparatuses can be more flexible in use and have better maneuverability. Embodiments of the wheeled carrying apparatus described herein include child stroller apparatuses. However, it will be appreciated that wheeled carrying apparatuses that may incorporate the structures and features described herein can include, without limitation, child stroller apparatuses, trolleys, shopping carts, and the like. Accordingly, it is understood that the structures and features described herein may be generally applicable to any types of products having wheels, and the wheeled carrying apparatuses as described and claimed herein are not limited to the examples illustrated hereinafter.

Figure 1:
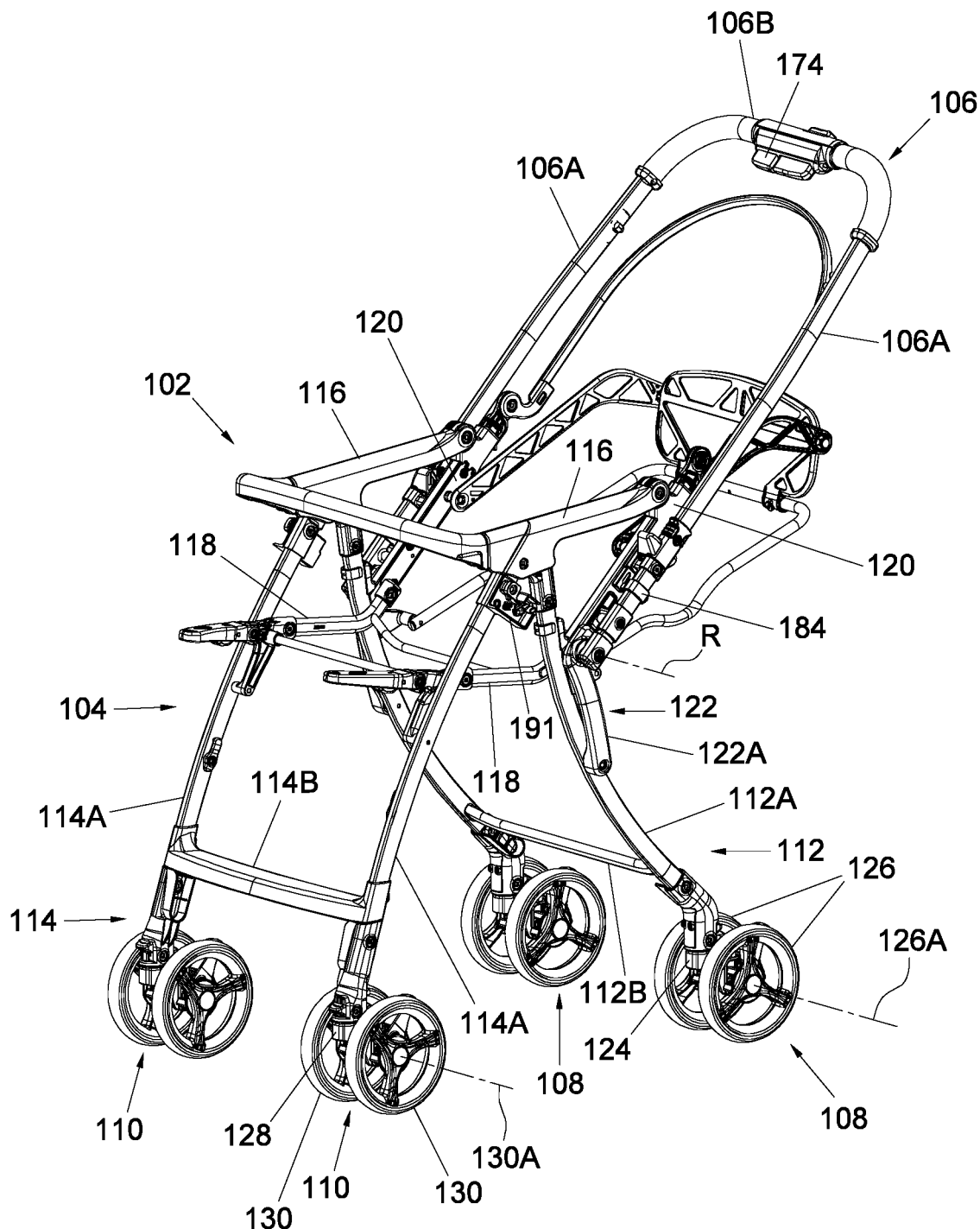
FIG. 1 is a perspective view illustrating an embodiment of a wheeled carrying apparatus.

FIG. 1 is a perspective view illustrating an embodiment of a wheeled carrying apparatus 100, which is exemplarily a child stroller apparatus. Referring to FIG. 1, the wheeled carrying apparatus 100 can include a frame structure 102 comprised of a standing frame 104 and a handle frame 106 coupled to each other, and a plurality of wheel assemblies 108 and 110 provided at a bottom of the standing frame 104.

According to an example of construction, the standing frame 104 can include two leg frames 112 and 114, two side linking bars 116, two side support bars 118 and two carrier bars 120. The leg frame 112 can be exemplarily a rear leg frame, and the leg frame 114 can be exemplarily a front leg frame. Each of the leg frames 112 and 114 can respectively include two side segments disposed symmetrically at a left and a right side of the standing frame 104, e.g., two side segments 112A for the leg frame 112 and two side segments 114A for the leg frame 114, and a transversal segment fixedly connected with the two side segments, e.g., a transversal segment 112B fixedly connected with the two side segments 112A for the leg frame 112, and a transversal segment 114B fixedly connected with the two side segments 114A for the leg frame 114. At each of the left and right sides, the side segment 112A of the leg frame 112 and the side segment 114A of the leg frame 114 can be respectively coupled pivotally to one side linking bar 116, and one side support bar 118 can extend between side segments 112A and 114A and can be pivotally coupled to the side segment 114A, whereby the leg frames 112 and 114, the side linking bars 116 and the side support bars 118 can rotate relative to one another during folding and unfolding of the wheeled carrying apparatus 100.

Figure 12:
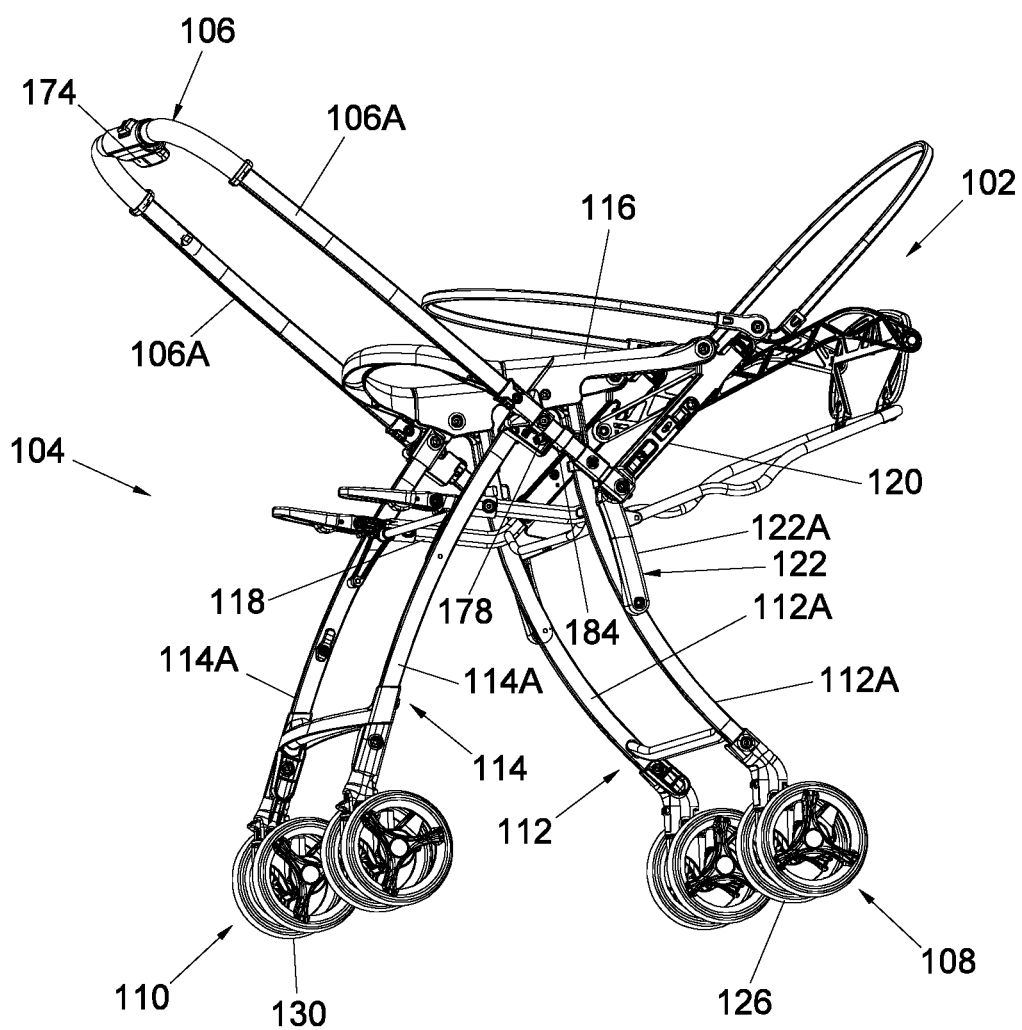
FIG. 12 is a perspective view illustrating the wheeled carrying apparatus with the handle frame inclined in a second position different from that shown in FIG. 1.

The handle frame 106 can be respectively coupled pivotally to the standing frame 104 at the left and right sides via two bar linkages 122, wherein each bar linkage 122 can include a bar 122A. More specifically, the handle frame 106 can include two side portions 106A disposed symmetrically at the left and right sides, and a grip portion 106B connected with the two side portions 106A. At each of the left and right sides, the carrier bar 120 can have an upper portion pivotally connected with the side linking bar 116, and a lower portion respectively connected pivotally with the side support bar 118, the bar 122A of the bar linkage 122 and the side portion 106A of the handle frame 106 about a common pivot axis R. The bar 122A of the bar linkage 122 can be respectively connected pivotally with the side segment 112A of the leg frame 112, and with the side portion 106A of the handle frame 106 about the pivot axis R. With this construction, the handle frame 106 can rotate about the pivot axis R relative to the standing frame 104 and the bar linkage 122 for adjustment between the two positions of different inclinations so that the wheeled carrying apparatus 100 can be pushed in different directions with a child facing forward or rearward. For example, the handle frame 106 can be inclined toward the side of the leg frame 112 in a first position as shown in FIG. 1, and inclined toward the side of the leg frame 114 in a second position as shown in FIG. 12.

Referring to FIG. 1, each of the wheel assemblies 108 and 110 can include a wheel mount that is pivotally connected with the standing frame 104 and carries at least a wheel rotatable relative to the wheel mount about a wheel axis extending generally horizontally, whereby the wheel mount is rotatable relative to the standing frame 104 for changing an orientation of the wheel axis. For example, two wheel assemblies 108 can be provided at the lower ends of the side segments 112A of the leg frame 112, and two wheel assemblies 110 can be respectively provided at the lower ends of the two side segments 114A of the leg frame 114. Each wheel assembly 108 can include a wheel mount 124 that is pivotally connected with the leg frame 112 and carries at least a wheel 126 rotatable relative to the wheel mount 124 about a wheel axis 126A extending generally horizontally, whereby the wheel mount 124 is rotatable for changing a horizontal orientation of the wheel axis 126A. Likewise, each wheel assembly 110 can include a wheel mount 128 that is pivotally connected with the leg frame 114 and carries at least a wheel 130 rotatable relative to the wheel mount 128 about a wheel axis 130A extending generally horizontally, whereby the wheel mount 128 is rotatable for changing a horizontal orientation of the wheel axis 130A. The wheel mounts 124 are spaced apart from the wheel mounts 128 along a lengthwise axis of the wheeled carrying apparatus 100 extending from a rear to a front thereof.

Figure 2:
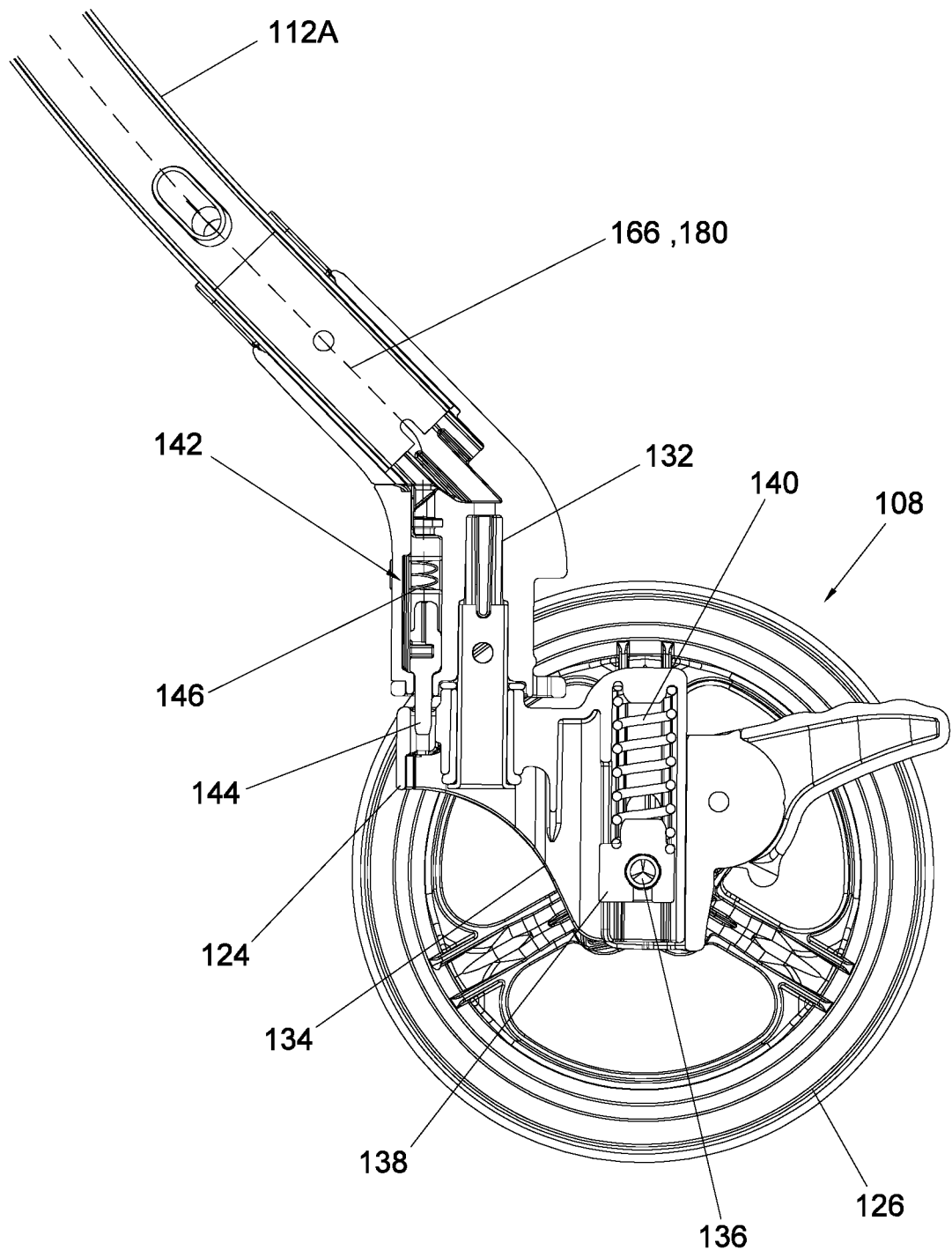
FIG. 2 is a cross-sectional view illustrating one wheel assembly provided in the wheeled carrying apparatus.

In conjunction with FIG. 1, FIG. 2 is a cross-sectional view illustrating one wheel assembly 108. Referring to FIGS. 1 and 2, the two wheel assemblies 108 can have a same construction. In each wheel assembly 108, the wheel mount 124 can be pivotally connected with the leg frame 112 about a pivot axle 132 so that the wheel mount 124 and the wheel 126 carried therewith can rotate in unison about the pivot axle 132. According to an example of construction, the wheel mount 124 can include a housing 134 that is pivotally connected with the leg frame 112 via the pivot axle 132. A wheel axle 136 defining the wheel axis 126A can be disposed through the housing 134 for pivotally connecting the wheel 126 with the wheel mount 124. According to an example of construction, the wheel axle 136 can be disposed through a sliding part 138 assembled inside the housing 134 for vertical sliding movement, and a spring 140 can be respectively connected with the sliding part 138 and the housing 134. The spring 140 can cushion a vertical displacement of the wheel 126 relative to the wheel mount 124 for dissipating undesirable shock energy during use.

Referring to FIG. 2, a locking assembly 142 is provided to rotationally lock and unlock the wheel mount 124 with respect to the standing frame 104. The locking assembly 142 can include a wheel mount latch 144 movably connected with the standing frame 104, and a locking spring 146 connected with the wheel mount latch 144. According to an example of construction, the wheel mount latch 144 can be slidably connected with the side segment 112A of the leg frame 112. More specifically, the side segment 112A can have a cavity, and the wheel mount latch 144 can have an elongate shape slidably received in the cavity of the side segment 112A, whereby the wheel mount latch 144 can slide to protrude outside the cavity or retract inward. The locking spring 146 can be disposed inside the cavity of the side segment 112A, and can have two ends respectively connected with the side segment 112A and the wheel mount latch 144. The locking spring 146 can bias the wheel mount latch 144 to protrude outward for engagement with the wheel mount 124.

In the locking assembly 142, the wheel mount latch 144 can slide downward to engage with the wheel mount 124 and thereby rotationally lock the wheel mount 124 with respect to the standing frame 104, and slide upward to disengage from the wheel mount 124 to unlock the wheel mount 124 so that the wheel mount 124 can rotate relative to the standing frame 104. The locking spring 146 can apply a biasing force for urging the wheel mount latch 144 to engage with the wheel mount 124. The same locking assembly 142 described above may be provided for each of the two wheel assemblies 108.

Figure 3:
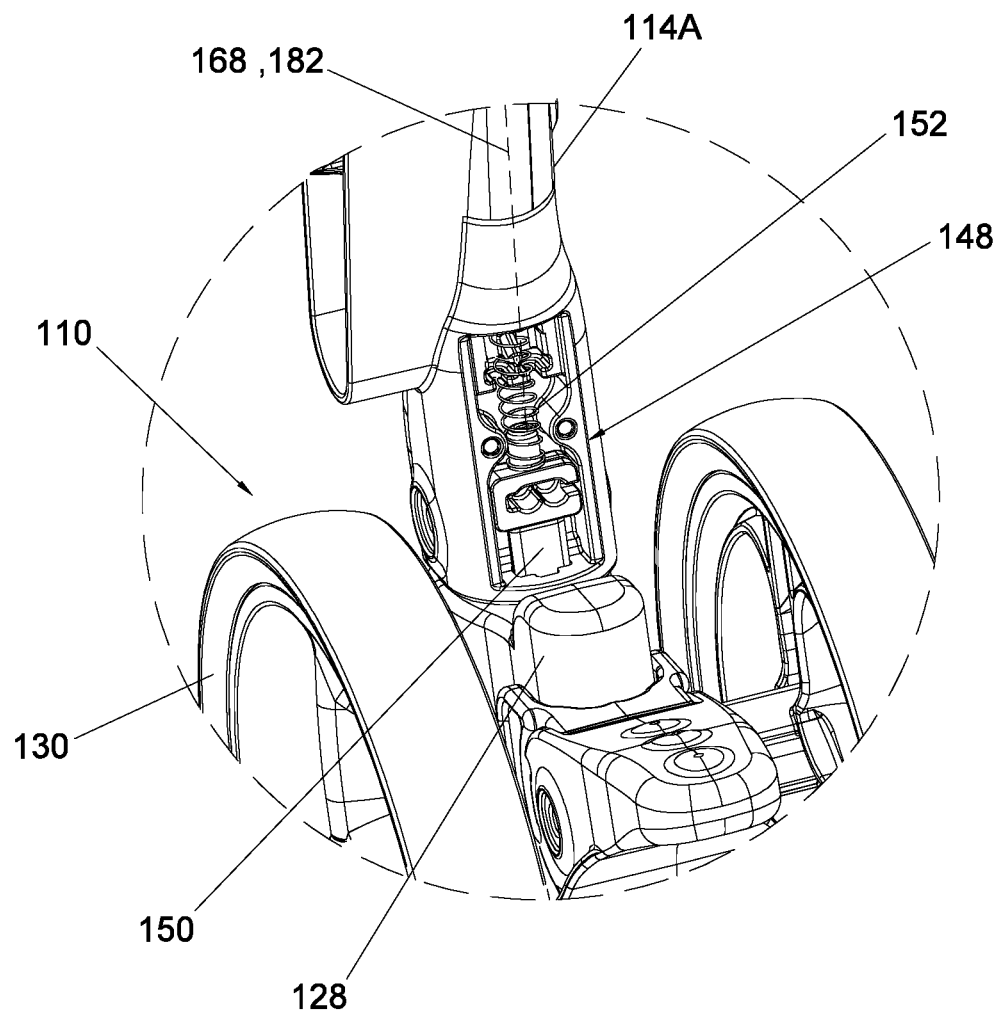
FIG. 3 is an enlarged perspective view illustrating another wheel assembly provided in the wheeled carrying apparatus.
Figure 4:
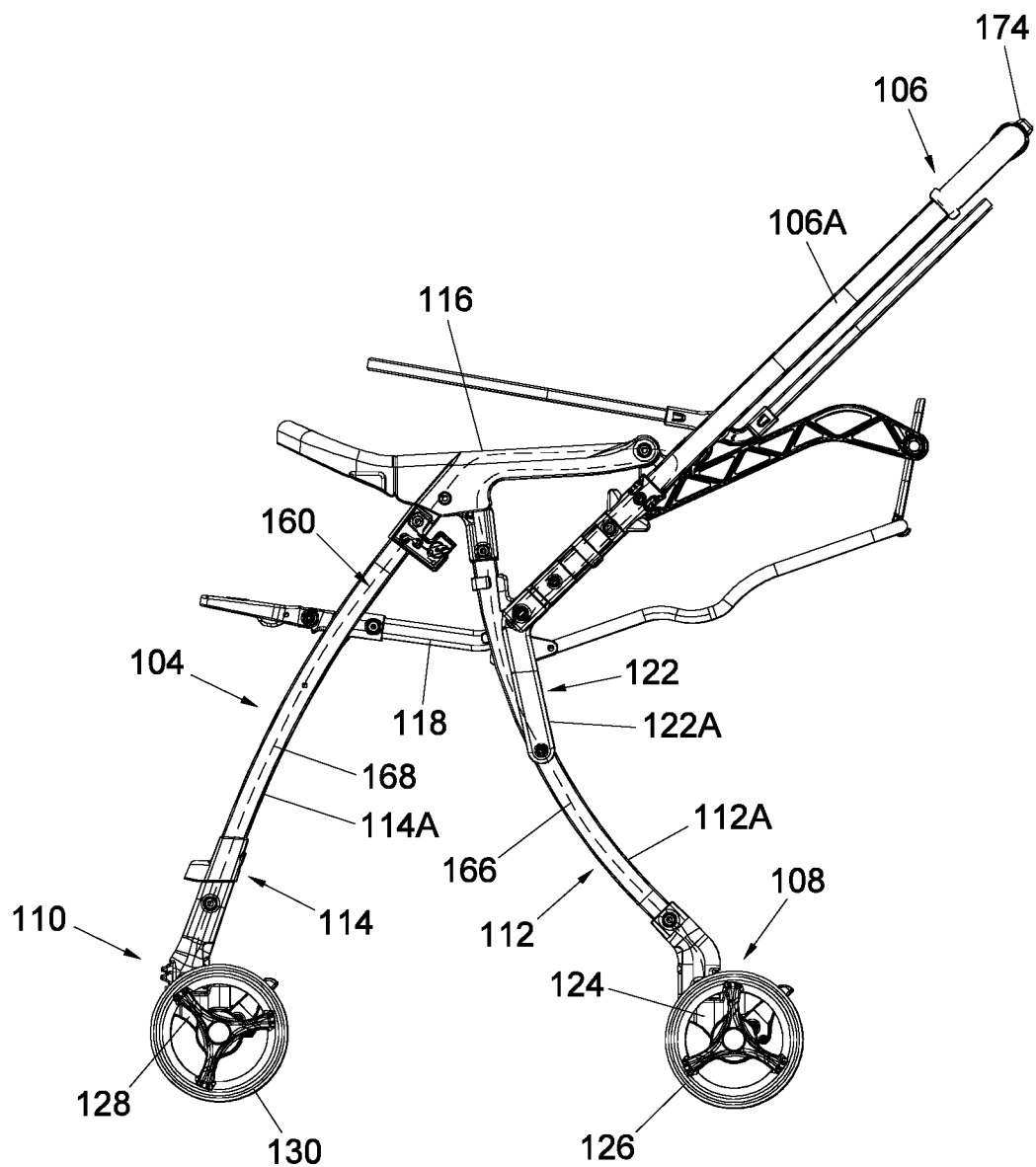
FIG. 4 is a side view illustrating some construction details of an actuating assembly provided in the wheeled carrying apparatus.

In conjunction with FIG. 1, FIG. 3 is an enlarged perspective view illustrating one wheel assembly 110. Referring to FIGS. 1 and 3, the wheel assembly 110 can have the same construction described previously, which can include the wheel mount 128 pivotally connected with the leg frame 114 so that the wheel mount 128 and the wheel 130 carried therewith can rotate in unison relative to the leg frame 114. Moreover, a locking assembly 148 can be provided to rotationally lock and unlock the wheel mount 128 with respect to the standing frame 104. The locking assembly 148 may have a construction similar to the locking assembly 142 of the wheel assembly 108. According to an example of construction, the locking assembly 148 can include a wheel mount latch 150 movably connected with the standing frame 104, and a locking spring 152 connected with the wheel mount latch 150. For example, the wheel mount latch 150 may be slidably connected with the side segment 114A of the leg frame 114, and the locking spring 152 can have two ends respectively connected with the side segment 114A and the wheel mount latch 150. The wheel mount latch 150 can thereby slide downward to engage with the wheel mount 128 and thereby rotationally lock the wheel mount 128 with respect to the standing frame 104, and can slide upward to disengage and unlock the wheel mount 128 so that the wheel mount 128 can freely rotate relative to the standing frame 104 for changing the horizontal orientation of the wheel axis 130A. The locking spring 152 can bias the wheel mount latch 150 to engage with the wheel mount 128.

In conjunction with FIGS. 1-3, FIGS. 4-11 are schematic views illustrating further construction details that can be provided in the wheeled carrying apparatus 100. Referring to FIGS. 1-9, the wheeled carrying apparatus 100 can further include an actuating assembly 160 and a release mechanism 162.

Referring to FIGS. 1-5, the actuating assembly 160 is respectively coupled to the handle frame 106 and the wheel mount latches 144 and 150, and is operable independent of the release mechanism 162 to switch the wheel mount latches 144 and 150 between a locking and an unlocking state in accordance with the position of the handle frame 106. According to an example of construction, the actuating assembly 160 can include a link actuator 164 coupled to the standing frame 104, a linking part 166 coupling the wheel mount latch 144 to the link actuator 164, and a linking part 168 coupling the wheel mount latch 150 to the link actuator 164, the wheel mount latches 144 and 150 being respectively associated with the wheel assemblies 108 and 110 located at a same side (i.e., a left or right side) of the wheeled carrying apparatus 100. The linking parts 166 and 168 can include one or more cable and are illustrated with phantom lines FIG. 4.

The link actuator 164 can move in a first direction to pull the linking part 168 and urge the wheel mount latch 150 to disengage from the wheel mount 128 and concurrently relax the linking part 166 so that the wheel mount latch 144 can engage with the wheel mount 124 under the biasing force of the locking spring 146, and in a second direction opposite to the first direction to pull the linking part 166 and urge the wheel mount latch 144 to disengage from the wheel mount 124 and concurrently relax the linking part 168 so that the wheel mount latch 150 can engage with the wheel mount 128 under the biasing force of the locking spring 152. The link actuator 164 is movably linked to the handle frame 106 so that the link actuator 164 is movable in the first direction or the second direction in response to a rotation of the handle frame 106 relative to the standing frame 104 between the first position and the second position of different inclinations. In this embodiment, the link actuator 164 can be pivotally connected with the standing frame 104 about the pivot axis R, and can rotate as a unitary part relative to the standing frame 104 in the first and second direction. According to an example of construction, the side portion 106A of the handle frame 106 can be fixedly connected with a shaft portion 170 extending along the pivot axis R, and the link actuator 164 can be disposed adjacent to the carrier bar 120 and can be rotationally coupled to the handle frame 106 by engaging the shaft portion 170 through a hole 164A provided in the link actuator 164, whereby the link actuator 164 and the handle frame 106 can rotate in unison about the pivot axis R relative to the standing frame 104. Examples of suitable structures for the link actuator 164 may include, without limitation, a rotary plate, a ring and the like.

Referring to FIGS. 1-5, the two linking parts 166 and 168 can include cable portions that are provided as separate cables or are defined from a single cable, and can be routed along the standing frame 104. Suitable cables may include any elongate and flexible structures that can be tensioned for transmitting a drawing force, which may include, without limitation, metallic cables, cords, ropes, wires, strings, bands, strips, and the like. According to an example of construction, the two linking parts 166 and 168 can respectively include two cable portions that respectively couple the wheel mount latches 144 and 150 to the link actuator 164. For example, the linking part 166 can include a cable portion that is anchored to the link actuator 164 via an attachment part 172 and has an end anchored to the wheel mount latch 144, and the linking part 168 can include a cable portion that is anchored to the link actuator 164 via the attachment part 172 and has an end anchored to the wheel mount latch 150. The linking part 166 can exemplarily extend from the wheel mount latch 144 along the side segment 112A of the leg frame 112, the side linking bar 116 and the carrier bar 120 to the link actuator 164. The linking part 168 can exemplarily extend from the wheel mount latch 150 along the side segment 114A of the leg frame 114, the side linking bar 116 and the carrier bar 120 to the link actuator 164. The linking parts 166 and 168 may extend substantially parallel to each other along the carrier bar 120.

According to an example of construction, the two linking parts 166 and 168 may be defined from a single cable that can thereby form an integral single linking part, which can be routed along the frame structure like previously described, and can have a first and a second end that are respectively anchored to the wheel mount latch 144 and the wheel mount latch 150 and an intermediate portion that loops around the link actuator 164 and is anchored to the link actuator 164 via the attachment part 172.

In the actuating assembly 160, the link actuator 164 can thus rotate along with the handle frame 106 in a first direction to pull the linking part 168 (in particular the end thereof that is anchored to the wheel mount latch 150) and thereby urge the wheel mount latch 150 to disengage and unlock the wheel mount 128 and concurrently relax the linking part 166 (in particular the end thereof that is anchored to the wheel mount latch 144) so that the wheel mount latch 144 is allowed to engage and lock the wheel mount 124. Moreover, the link actuator 164 can rotate along with the handle frame 106 in a second direction opposite to the first direction to pull the linking part 166 (in particular the end thereof that is anchored to the wheel mount latch 144) and thereby urge the wheel mount latch 144 to disengage and unlock the wheel mount 124 and concurrently relax the linking part 168 (in particular the end thereof that is anchored to the wheel mount latch 150) so that the wheel mount latch 150 is allowed to engage and lock the wheel mount 128.

Since the two wheels assemblies 108 and 110 are provided at each of the left and right side of the wheeled carrying apparatus 100, the actuating assembly 160 can be symmetrically arranged at the left and right side.

Referring to FIGS. 1-3 and 5-8, the release mechanism 162 includes an operating part 174 carried with the handle frame 106, and is configured so that the operating part 174 can be operatively coupled to one of the wheel mount latches 144 and 150 and decoupled from the other one of the wheel mount latches 144 and 150 depending on whether the handle frame 106 is in the first position inclined toward the side of the leg frame 112 or the second position inclined toward the side of the leg frame 114. For example, the operating part 174 is operable to cause the wheel mount latch 144 to disengage from the wheel mount 124 and meanwhile is operatively decoupled from the wheel mount latch 150 when the handle frame 106 is in the first position. When the handle frame 106 is in the second position, the operating part 174 is operable to cause the wheel mount latch 150 to disengage from the wheel mount 128 and meanwhile is operatively decoupled from the wheel mount latch 144. To this end, an embodiment of the release mechanism 162 can include the operating part 174, two link actuators 176 and 178 operable independently of each other, a linking part 180 coupling the wheel mount latch 144 to the link actuator 176, a linking part 182 coupling the wheel mount latch 150 to the link actuator 178, a driving part 184 carried with the handle frame 106, and a linking part 186 coupling the driving part 184 to the operating part 174. The linking parts 180, 182 and 186 may include cables and are illustrated with phantom lines in FIG. 6. Suitable cables may include any elongate and flexible structures that can be tensioned for transmitting a drawing force, which may include, without limitation, metallic cables, cords, ropes, wires, strings, bands, strips, and the like.

Referring to FIGS. 1-3 and 5-7, the link actuator 176 is movably connected with the standing frame 104, and can respectively move in one direction to pull the linking part 180 and thereby urge the wheel mount latch 144 to disengage from the wheel mount 124 and in an opposite direction to relax the linking part 180 so that the wheel mount latch 144 can engage with the wheel mount 124. The link actuator 176 can be placed at a position that is adjacent to the side portion 106A of the handle frame 106 when the handle frame 106 is in the first position. According to an example of construction, the link actuator 176 can be movably connected and carried with the carrier bar 120 of the standing frame 104, and can have a protrusion 176A projecting sideways. For example, the link actuator 176 may be slidably connected with the carrier bar 120, and can slide upward to pull the linking part 180 and thereby urge the wheel mount latch 144 to disengage from the wheel mount 124 and slide downward to relax the linking part 180 so that the wheel mount latch 144 can engage with the wheel mount 124.

The linking part 180 can include a cable, which may have one end anchored to the link actuator 176 and another end anchored to the wheel mount latch 144. The linking part 180 may extend substantially parallel to the two linking parts 166 and 168 of the actuating assembly 160 along a portion of the carrier bar 120.

Figure 5:
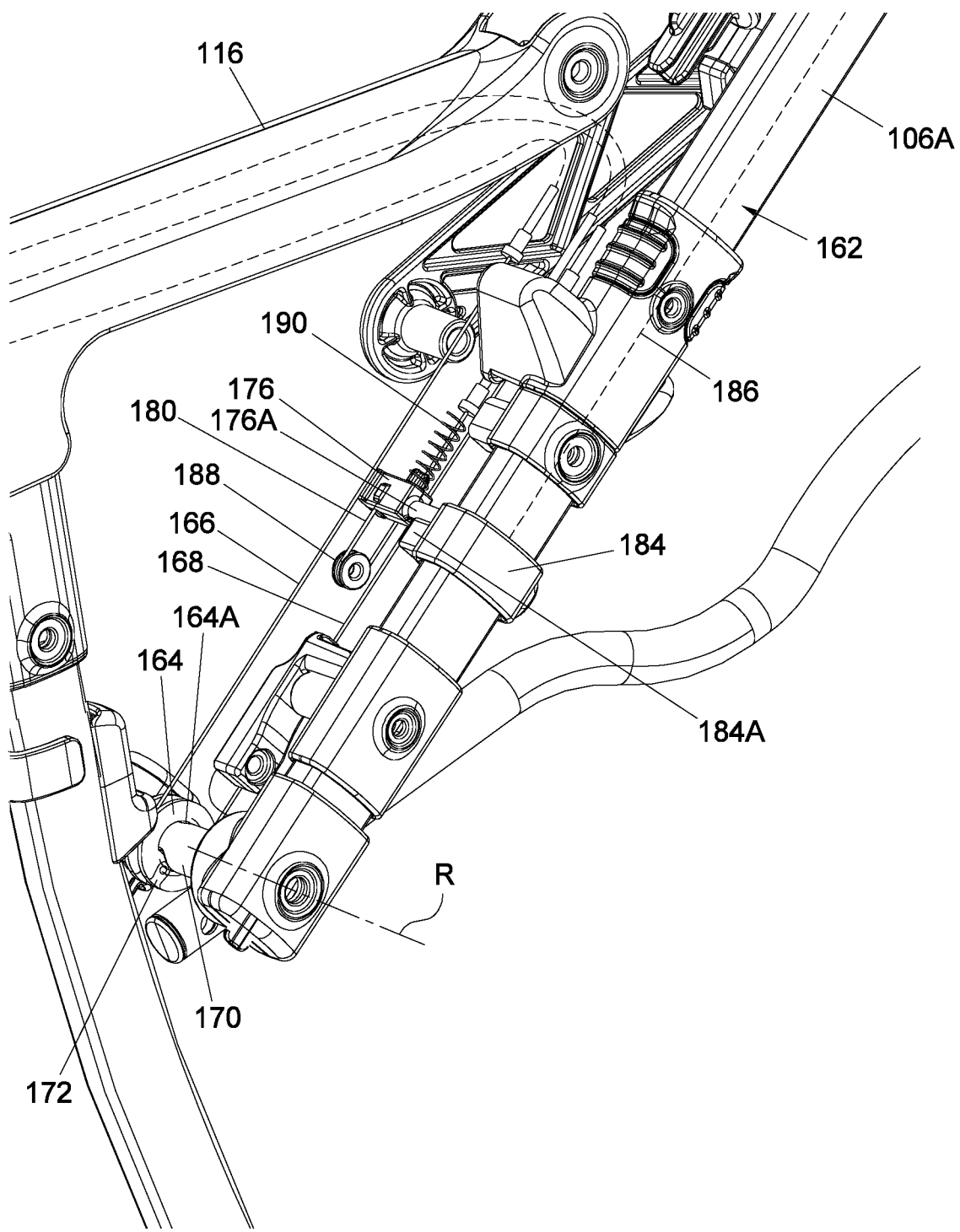
FIG. 5 is a perspective view illustrating some construction details of the actuating assembly and a release mechanism provided in the wheeled carrying apparatus.
Figure 6:
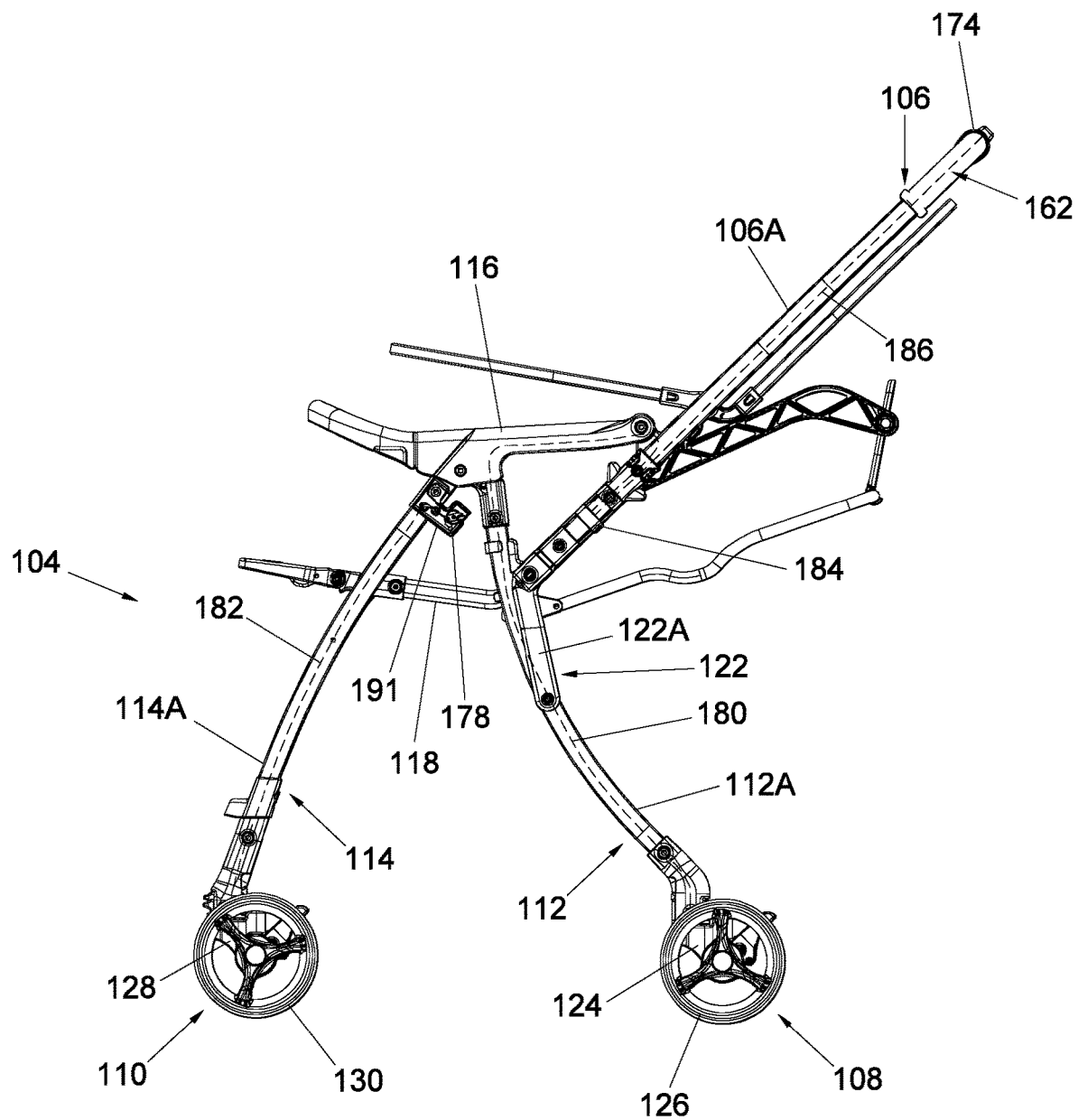
FIG. 6 is a side view illustrating some construction details of the release mechanism provided in the wheeled carrying apparatus.
Figure 7:
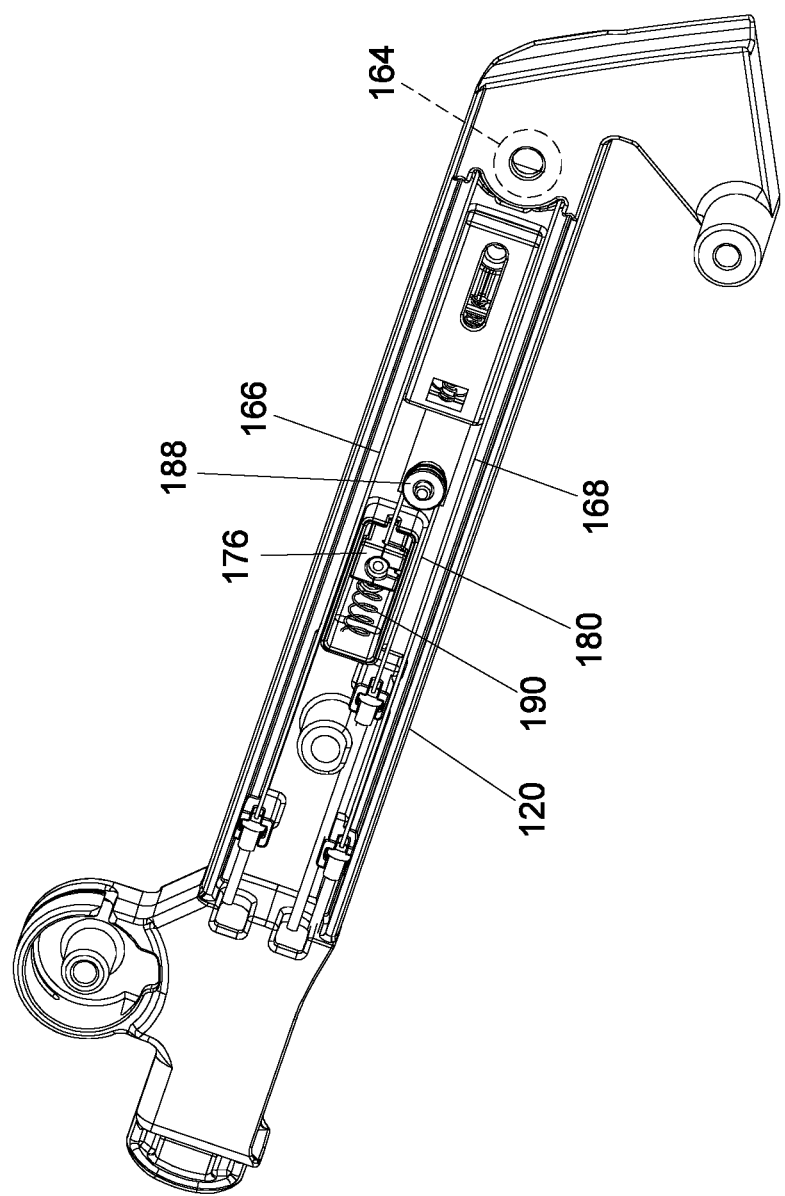
FIG. 7 is a perspective view illustrating a portion of the actuating assembly and release mechanism connected with a carrier bar in the frame structure of the wheeled carrying apparatus.

Referring to FIGS. 5-7, the linking part 180 may extend along a portion of the side segment 112A of the leg frame 112, a portion of the side linking bar 116, a portion of the carrier bar 120, and can loop around a pulley 188 that is pivotally connected with the carrier bar 120. The pulley 188 may be disposed in a region of the carrier bar 120 that is located between the link actuator 164 of the actuating assembly 160 and the link actuator 176.

Figure 10:
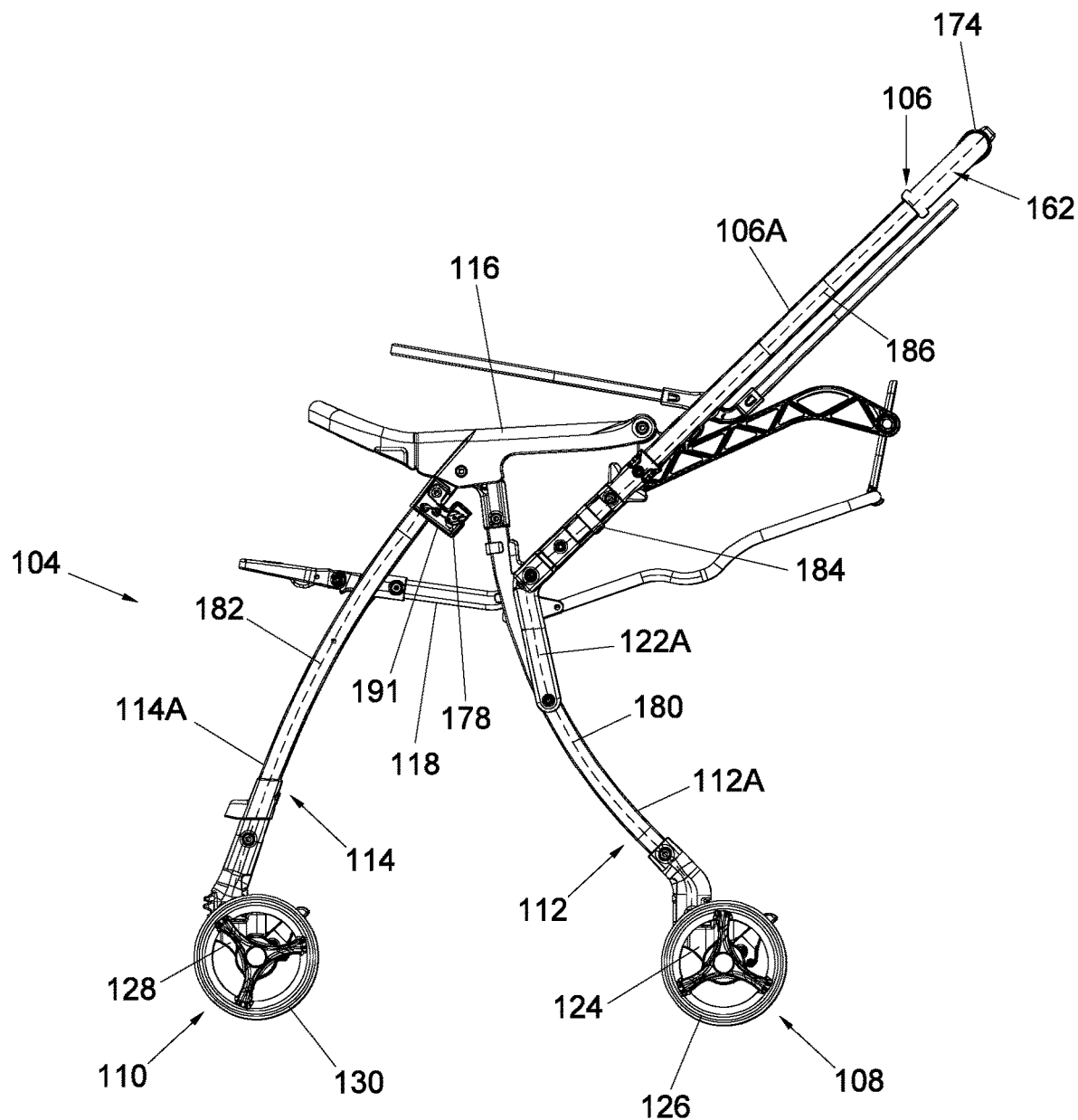
FIG. 10 is a side view illustrating a variant construction of the release mechanism.
Figure 11:
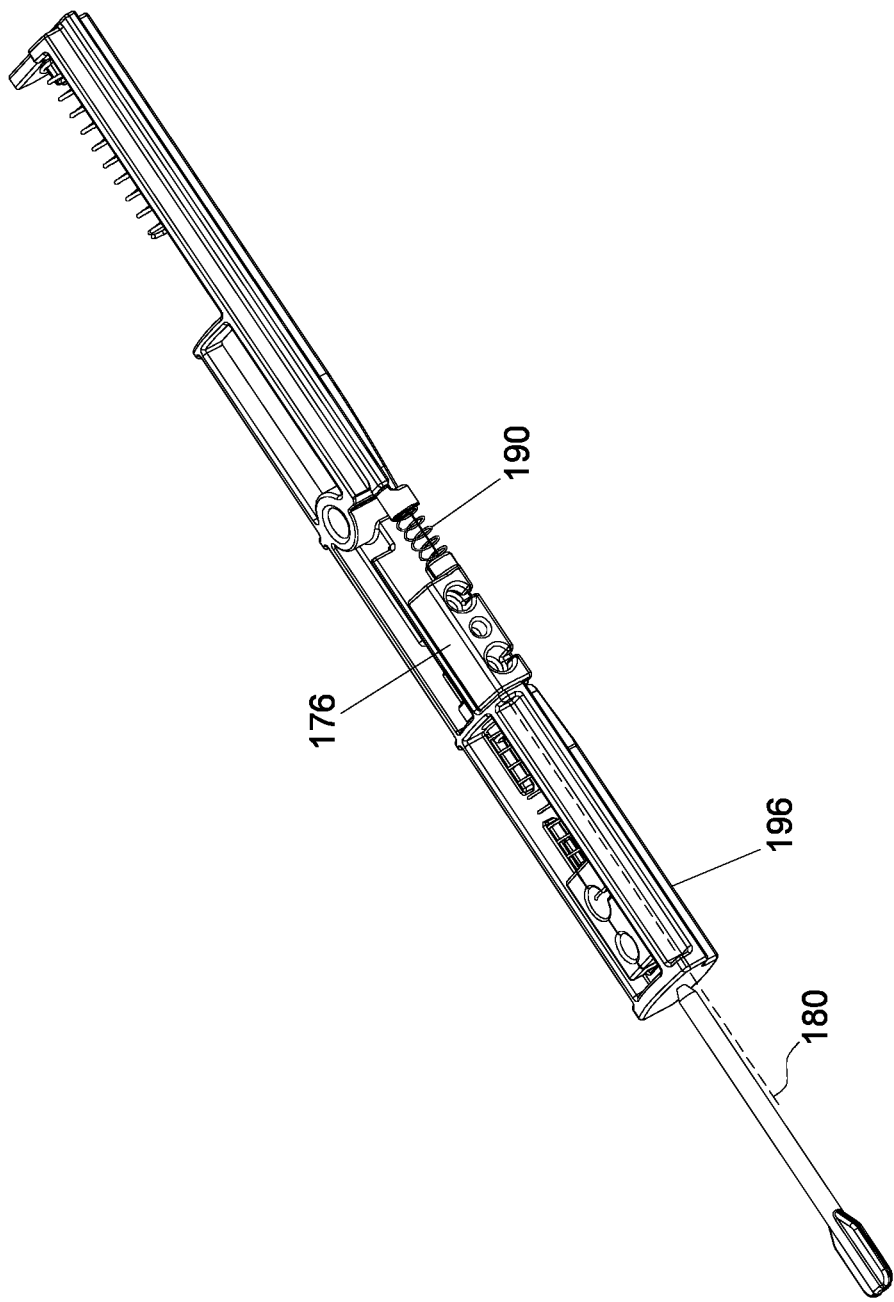
FIG. 11 is a perspective view illustrating some construction details of the release mechanism shown in FIG. 10.

FIGS. 10 and 11 illustrate a variant construction in which the linking part 180 can operate like previously described but is routed along a different path. Referring to FIGS. 10 and 11, the linking part 180 may extend along a portion of the side segment 112A of the leg frame 112, the bar 122A and a portion of the carrier bar 120 for connecting with the link actuator 176. In this variant construction, the pulley 188 can be omitted, and the link actuator 176 can be connected with a coupling rod 196 provided on the carrier bar 120. The coupling rod 196 can slide along with the link actuator 176 to pull the linking part 180 and urge the wheel mount latch 144 to disengage from the wheel mount 124.

Referring to FIGS. 5 and 7, the release mechanism 162 can further include a spring 190 connected with the link actuator 176. For example, the spring 190 may have one end connected with the link actuator 176, and another end connected with an anchor structure fixedly connected with the carrier bar 120. The spring 190 can bias the link actuator 176 in a direction that urges the link actuator 176 in contact with the driving part 184.

In the variant construction illustrated in FIG. 11, the spring 190 can operate in a same manner, and may be connected between the link actuator 176 and an anchor structure provided on the coupling rod 196.

Figure 8:
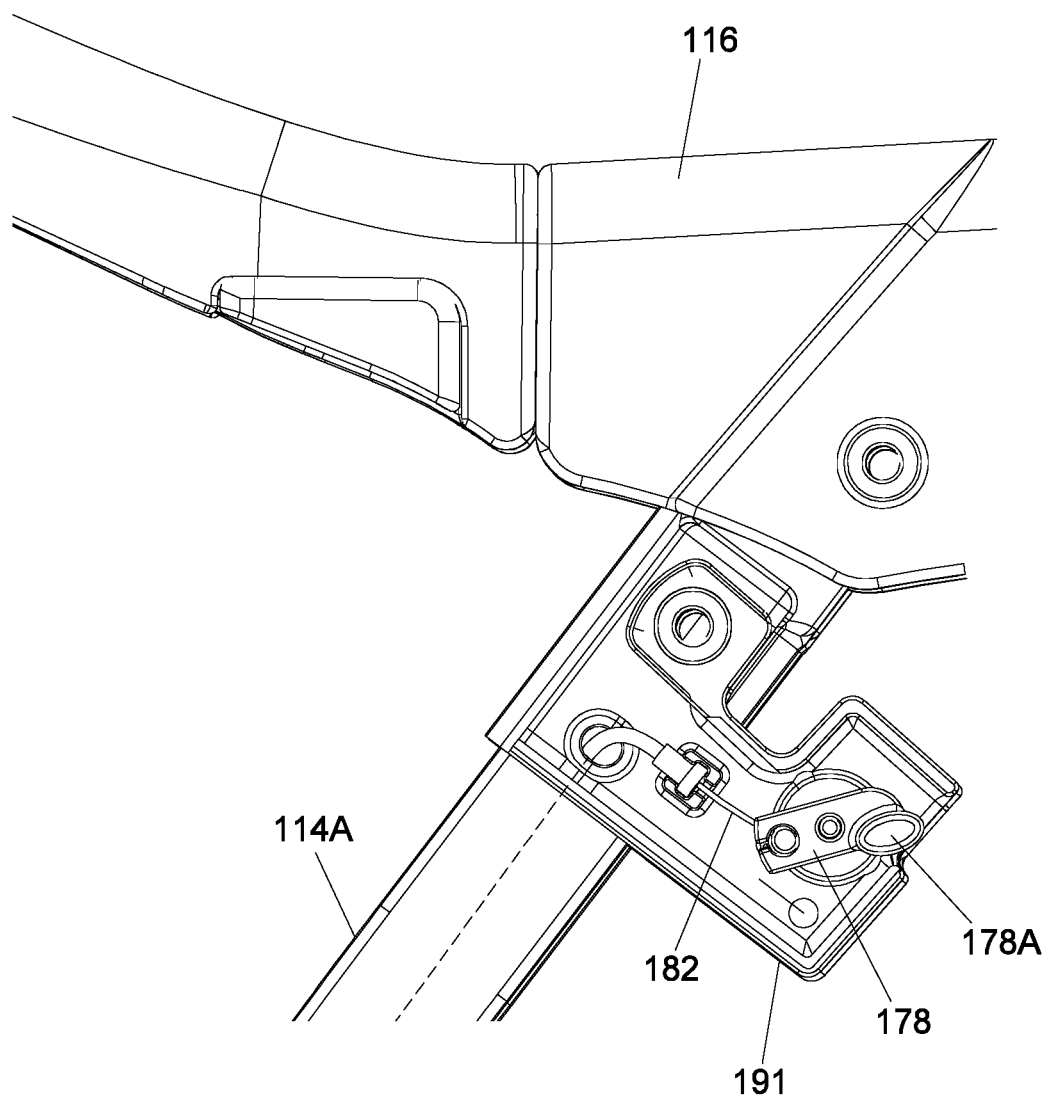
FIG. 8 is an enlarged view illustrating another portion of the release mechanism provided on a leg frame of the wheeled carrying apparatus.

Referring to FIGS. 6 and 8, the link actuator 178 is movably connected with the standing frame 104, and can respectively move in one direction to pull the linking part 182 and thereby urge the wheel mount latch 150 to disengage from the wheel mount 128 and in an opposite direction to relax the linking part 182 so that the wheel mount latch 150 can engage with the wheel mount 128. The link actuator 178 can be placed at a position that is adjacent to the side portion 106A of the handle frame 106 when the handle frame 106 is in the second position. According to an example of construction, the link actuator 178 can be movably connected and carried with the side segment 114A of the leg frame 114, and can have a protrusion 178A projecting sideways. For example, the link actuator 178 may be pivotally connected with a bracket 191 that is fixedly attached to the side segment 114A of the leg frame 114, and can rotate in one direction to pull the linking part 182 and thereby urge the wheel mount latch 150 to disengage from the wheel mount 128 and rotate in an opposite direction to relax the linking part 182 so that the wheel mount latch 150 can engage with the wheel mount 128. It will be appreciated that the aforementioned pivotal connection is only an example of movably connecting the link actuator 178 with the side segment 114A of the leg frame 114, and other movable connections of the link actuator 178 may be suitable for pulling or relaxing the linking part 182. For example, a variant construction may have the link actuator 178 slidably connected with the side segment 114A of the leg frame 114 so that the link actuator 178 can slide for pulling or relaxing the linking part 182. According to an example of construction, the linking part 182 can include a cable, which may have one end anchored to the link actuator 178 and another end anchored to the wheel mount latch 150. According to an example of construction, the linking part 182 may extend along a portion of the side segment 114A of the leg frame 114 from the wheel mount latch 150 to the link actuator 178.

Referring to FIGS. 5-8, the driving part 184 is movably connected and carried with the handle frame 106, and is coupled to the operating part 174 via the linking part 186. According to an example of construction, the driving part 184 can be slidably connected with the side portion 106A of the handle frame 106 in a region below the side linking bar 116, and can have a protrusion 184A projecting sideways. Accordingly, the driving part 184 is movable along with the handle frame 106 when the handle frame 106 rotates relative to the standing frame 104 between the first and second position of different inclinations. When the handle frame 106 is in the first position inclined toward the side of the leg frame 112, the driving part 184 can be located adjacent to the link actuator 176 and displaced away from the link actuator 178. When the handle frame 106 is in the second position inclined toward the side of the leg frame 114, the driving part 184 can be located adjacent to the link actuator 178 and displaced away from the link actuator 176.

According to an example of construction, the linking part 186 can include a cable, which may have one end anchored to the driving part 184 and another end anchored to the operating part 174. For example, the operating part 174 may be provided on the grip portion 106B of the handle frame 106, and the linking part 186 can extend along the side portion 106A of the handle frame 106 and can have two opposite ends respectively anchored to the operating part 174 and the driving part 184. Accordingly, the operating part 174 can be operable to cause the driving part 184 to move relative to the side portion 106A of the handle frame 106 and selectively urge either of the link actuator 176 and 178 in movement for unlocking either of the wheel mount latch 144 and 150. For example, the operating part 174 is operable to cause the wheel mount latch 144 to disengage from the wheel mount 124 via a contact between the driving part 184 and the link actuator 176 when the handle frame 106 is in the first position, and the operating part 174 is operable to cause the wheel mount latch 150 to disengage from the wheel mount 128 via a contact between the driving part 184 and the link actuator 178 when the handle frame 106 is in the second position.

Figure 9:
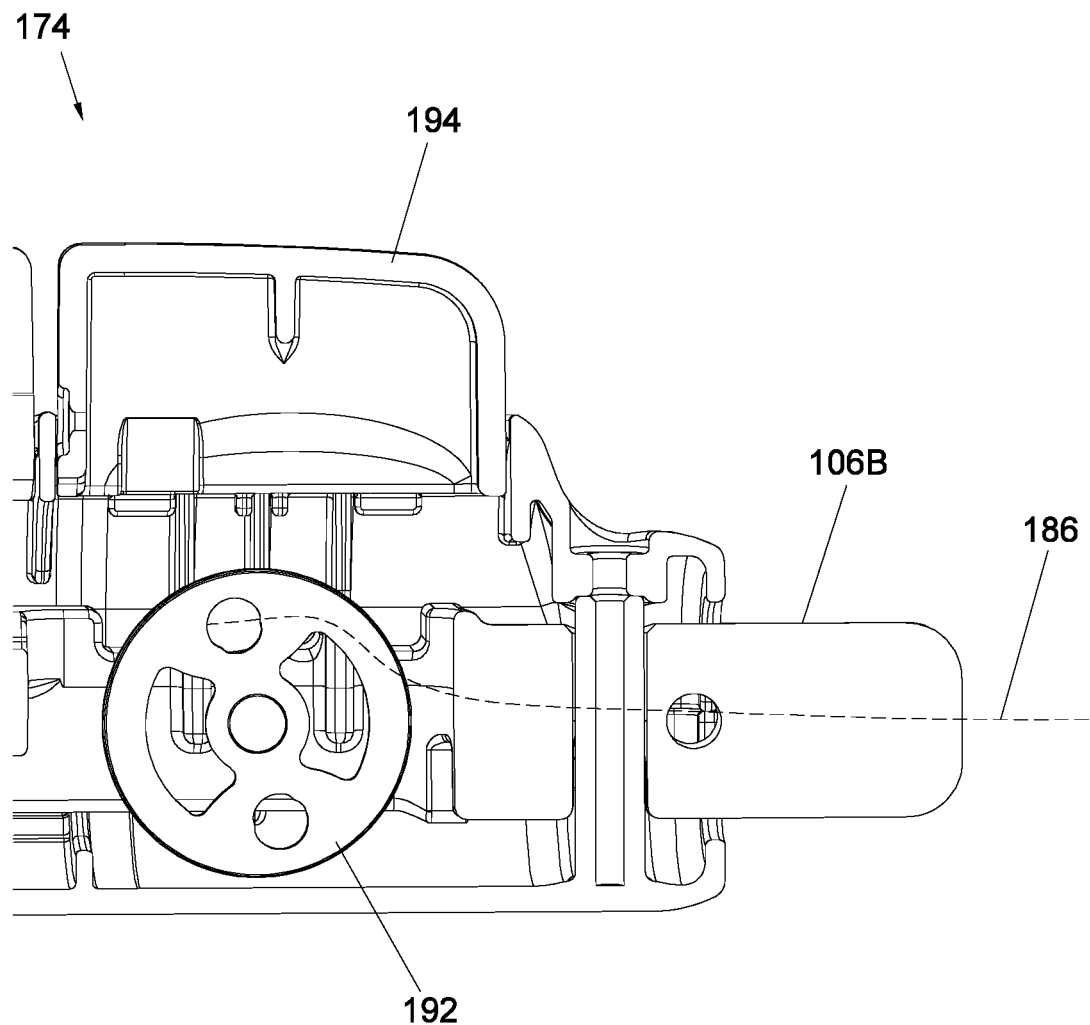
FIG. 9 is an enlarged view illustrating construction details of an operating part provided on a handle frame of the wheeled carrying apparatus.

FIG. 9 is an enlarged view illustrating construction details of the operating part 174. Referring to FIG. 9, the operating part 174 can include a barrel 192 and a button 194. The barrel 192 can be pivotally connected with the grip portion 106B of the handle frame 106, and the linking part 186 can have an end anchored to the barrel 192. The button 194 can be slidably connected with the grip portion 106B and pivotally connected with the barrel 192. With this construction, the button 194 can be pressed to urge the barrel 192 to rotate for pulling the linking part 186 so that the driving part 184 is urged in movement relative to the handle frame 106.

Since the two wheels assemblies 108 and 110 are provided at each of the left and right side of the wheeled carrying apparatus 100, the release mechanism 162 can be symmetrically arranged at the left and right side and likewise coupled to the operating part 174.

In the wheeled carrying apparatus 100, the handle frame 106 can be inclined toward the side of the leg frame 112 in the first position and toward the side of the leg frame 114 in the second position. The link actuator 164 of the actuating assembly 160 can rotate along with the handle frame 106 in the first direction for pulling the linking part 168 and relaxing the linking part 166 when the handle frame 106 rotates from the second position to the first position, which can cause the wheel mount latch 150 to disengage and unlock the wheel mount 128 and cause the wheel mount latch 144 to engage and lock the wheel mount 124. Conversely, the link actuator 164 can rotate along with the handle frame 106 in the second direction for pulling the linking part 166 and relaxing the linking part 168 when the handle frame 106 rotates from the first position to the second position, which can cause the wheel mount latch 144 to disengage and unlock the wheel mount 124 and cause the wheel mount latch 150 to engage and lock the wheel mount 128.

While the handle frame 106 is in the first position and the operating part 174 is released, the wheel mount latch 144 is engaged with the wheel mount 124 to lock the wheel mount 124 to the standing frame 104, and the wheel mount latch 150 is kept disengaged from the wheel mount 128 by a distance so that the wheel mount 128 is unlocked for free rotation relative to the standing frame 104. For unlocking the wheel mounts 124 and 128 while the handle frame 106 is in the first position, a caregiver can actuate the operating part 174 to pull the linking part 186, which causes the driving part 184 to slide upward and urge the link actuator 176 in movement against the biasing force of the spring 190 via a contact between the protrusion 184A of the driving part 184 and the protrusion 176A of the link actuator 176. As a result, the link actuator 176 can pull the linking part 180 and thereby urge the wheel mount latch 144 to disengage from the wheel mount 124. Meanwhile, the wheel mount latch 150 is not affected by the actuation of the operating part 174 and can remain in position disengaged from the wheel mount 128 by the same distance. Accordingly, all of the wheel mounts 124 and 128 can be unlocked at the same time in the first position of the handle frame 106.

While the handle frame 106 is in the second position and the operating part 174 is released, the wheel mount latch 150 is engaged with the wheel mount 128 to lock the wheel mount 128 to the standing frame 104, and the wheel mount latch 144 is kept disengaged from the wheel mount 124 by a distance so that the wheel mount 124 is unlocked for free rotation relative to the standing frame 104. For unlocking the wheel mounts 124 and 128 while the handle frame 106 is in the second position, a caregiver can actuate the operating part 174 to pull the linking part 186, which causes the driving part 184 to slide upward and urge the link actuator 178 in movement via a contact between the protrusion 184A of the driving part 184 and the protrusion 178A of the link actuator 176. As a result, the link actuator 178 can pull the linking part 182 and thereby urge the wheel mount latch 150 to disengage from the wheel mount 128. Meanwhile, the wheel mount latch 144 is not affected by the actuation of the operating part 174 and can remain in position disengaged from the wheel mount 124 by the same distance. Accordingly, all of the wheel mounts 124 and 128 can be unlocked at the same time in the second position of the handle frame 106.

Since the operating part 174 is operatively coupled to only one of the wheel mount latches 144 and 150 at a time at each of the left and right side, the actuation for having all of the wheel mounts 124 and 128 unlocked at the same time would require a driving force that is relatively smaller. Therefore, less effort would be required to actuate the operating part 174, and the component parts of the release mechanism 162 can be subjected to less mechanical stress.

Advantages of the wheeled carrying apparatuses described herein include the ability to lock and unlock wheel assemblies with respect to a standing frame in a flexible manner. According to the needs, some of the wheel assemblies are locked while others are unlocked, or all of the wheel assemblies are unlocked at the same time as desired. Accordingly, the wheeled carrying apparatuses can be more flexible in use and offer better maneuverability.

Realization of the wheeled carrying apparatuses has been described in the context of particular embodiments. These embodiments are meant to be illustrative and not limiting. Many variations, modifications, additions, and improvements are possible. These and other variations, modifications, additions, and improvements may fall within the scope of the inventions as defined in the claims that follow.

What is claimed is:

1. A wheeled carrying apparatus comprising:
   a standing frame and a handle frame pivotally coupled to each other, the handle frame being rotatable relative to the standing frame between a first position and a second position of different inclinations;
   a first wheel mount carrying a first wheel and pivotally connected with the standing frame, the first wheel being rotatable relative to the first wheel mount about a first wheel axis;
   a locking assembly including a first wheel mount latch movably connected with the standing frame, the first wheel mount latch being adapted to engage with the first wheel mount and thereby rotationally lock the first wheel mount with respect to the standing frame, and adapted to disengage from the first wheel mount and thereby unlock the first wheel mount so that the first wheel mount is rotatable relative to the standing frame for changing an orientation of the first wheel axis; and
   a release mechanism including an operating part carried with the handle frame, the release mechanism being configured to cause the operating part to be coupled to the first wheel mount latch so that the operating part is operable to cause the first wheel mount latch to disengage from the first wheel mount when the handle frame is in the first position, and to cause the operating part to be decoupled from the first wheel mount latch when the handle frame is in the second position.

2. The wheeled carrying apparatus according to claim 1, wherein the release mechanism includes:
   a link actuator movably connected with the standing frame;
   a first linking part coupling the first wheel mount latch to the link actuator;
   a driving part movably connected with the handle frame; and
   a second linking part coupling the driving part to the operating part;
   wherein the driving part is located adjacent to the link actuator when the handle frame is in the first position and is displaced away from the link actuator when the handle frame is in the second position, the operating part being operable to cause the first wheel mount latch to disengage from the first wheel mount via a contact between the driving part and the link actuator when the handle frame is in the first position.

3. The wheeled carrying apparatus according to claim 2, wherein any one of the first linking part and the second linking part includes a cable.

4. The wheeled carrying apparatus according to claim 2, wherein the first linking part loops around a pulley.

5. The wheeled carrying apparatus according to claim 2, wherein the link actuator is connected with a spring, the spring biasing the link actuator in a direction that urges the link actuator in contact with the driving part.

6. The wheeled carrying apparatus according to claim 2, wherein the driving part is slidably connected with the handle frame.

7. The wheeled carrying apparatus according to claim 2, wherein the standing frame includes a carrier bar pivotally connected with the handle frame, the link actuator being movably connected and carried with the carrier bar.

8. The wheeled carrying apparatus according to claim 1, further including:
   a second wheel mount carrying a second wheel and pivotally connected with the standing frame, the second wheel being rotatable relative to the second wheel mount about a second wheel axis, the first and second wheel mounts being spaced apart from each other along a lengthwise axis of the wheeled carrying apparatus extending from a rear to a front thereof; and
   a second locking assembly including a second wheel mount latch movably connected with the standing frame, the second wheel mount latch being adapted to engage with the second wheel mount and thereby rotationally lock the second wheel mount with respect to the standing frame, and adapted to disengage from the second wheel mount and thereby unlock the second wheel mount so that the second wheel mount is rotatable relative to the standing frame for changing an orientation of the second wheel axis;
   wherein the release mechanism is configured to cause the operating part to be coupled to the first wheel mount latch and meanwhile decoupled from the second wheel mount latch so that the operating part is operable to cause the first wheel mount latch to disengage from the first wheel mount when the handle frame is in the first position, and to cause the operating part to be coupled to the second wheel mount latch and meanwhile decoupled from the first wheel mount latch so that the operating part is operable to cause the second wheel mount latch to disengage from the second wheel mount when the handle frame is in the second position.

9. The wheeled carrying apparatus according to claim 8, wherein the release mechanism includes:
   a first and a second link actuator respectively connected movably with the standing frame, the first link actuator being operable independently of the second link actuator;
   a driving part carried with the handle frame;
   a first linking part coupling the first wheel mount latch to the first link actuator;
   a second linking part coupling the driving part to the operating part; and
   a third linking part coupling the second wheel mount latch to the second link actuator;
   wherein the driving part is located adjacent to the first link actuator and displaced away from the second link actuator when the handle frame is in the first position, and is located adjacent to the second link actuator and displaced away from the first link actuator when the handle frame is in the second position, the operating part being operable to cause the first wheel mount latch to disengage from the first wheel mount via a contact between the driving part and the first link actuator when the handle frame is in the first position, and the operating part being operable to cause the second wheel mount latch to disengage from the second wheel mount via a contact between the driving part and the second link actuator when the handle frame is in the second position.

10. The wheeled carrying apparatus according to claim 9, wherein any one of the first, second and third linking part includes a cable.

11. The wheeled carrying apparatus according to claim 9, wherein the first link actuator is slidably connected with the standing frame.

12. The wheeled carrying apparatus according to claim 9, wherein the second link actuator is pivotally or slidably connected with the standing frame.

13. The wheeled carrying apparatus according to claim 9, wherein the driving part is slidably connected with the handle frame.

14. The wheeled carrying apparatus according to claim 9, wherein the standing frame includes a first leg frame having a first side segment, and a second leg frame having a second side segment, the first linking part extending along a portion of the first side segment, and the third linking part extending along a portion of the second side segment.

15. The wheeled carrying apparatus according to claim 14, wherein the second link actuator is movably connected and carried with the second leg frame.

16. The wheeled carrying apparatus according to claim 15, wherein the standing frame further includes a carrier bar pivotally connected with the handle frame, the first link actuator being movably connected and carried with the carrier bar.

17. The wheeled carrying apparatus according to claim 16, wherein the handle frame is pivotally coupled to the standing frame via a bar linkage, and the standing frame further includes a side linking bar, the bar linkage being respectively connected pivotally with the first side segment of the first leg frame and the handle frame, and the carrier bar being respectively connected pivotally with the side linking bar, the bar linkage and the handle frame.

18. The wheeled carrying apparatus according to claim 17, wherein the first linking part further extends along a portion of the side linking bar and a portion of the carrier bar.

19. The wheeled carrying apparatus according to claim 17, wherein the first linking part further extends along a portion of the bar linkage and a portion of the carrier bar.

20. The wheeled carrying apparatus according to claim 8, further including an actuating assembly that is respectively coupled to the first wheel mount latch and the second wheel mount latch and is operable independent of the release mechanism, wherein the actuating assembly includes:
  a third link actuator rotationally coupled to the handle frame; and
  a fourth linking part that loops around the third link actuator and has a first and a second end respectively anchored to the first wheel mount latch and the second wheel mount latch;
  wherein the third link actuator is rotatable along with the handle frame in a first direction to pull the second end of the fourth linking part and thereby urge the second wheel mount latch to disengage from the second wheel mount and concurrently relax the first end of the fourth linking part for engagement of the first wheel mount latch with the first wheel mount, and the third link actuator is rotatable along with the handle frame in a second direction opposite to the first direction to pull the first end of the fourth linking part and thereby urge the first wheel mount latch to disengage from the first wheel mount and concurrently relax the second end of the fourth linking part for engagement of the second wheel mount latch with the second wheel mount.

21. The wheeled carrying apparatus according to claim 20, wherein the fourth linking part includes a cable.

22. The wheeled carrying apparatus according to claim 20, wherein the standing frame further includes a carrier bar pivotally connected with the handle frame about a pivot axis, the handle frame being rotatable about the pivot axis relative to the standing frame between the first position and the second position, the third link actuator being pivotally connected with the standing frame about the same pivot axis, and the fourth linking part extending along the carrier bar.

23. The wheeled carrying apparatus according to claim 1, being implemented as a child stroller apparatus.

\* \* \* \* \*